United States Patent [19]

MacWilliams et al.

[11] Patent Number: 4,850,473
[45] Date of Patent: Jul. 25, 1989

[54] CONVEYOR SYSTEM INCLUDING A BUFFER STORE

[75] Inventors: David MacWilliams, Waterlooville; Duncan A. Paton, Portsmouth; Arthur C. Larcombe, Gosport; Stephen G. Baker, Emsworth, all of England

[73] Assignee: International Business Machines Corporation, Armonk, N.Y.

[21] Appl. No.: 76,954

[22] Filed: Jul. 23, 1987

[30] Foreign Application Priority Data

Jul. 31, 1986 [GB] United Kingdom ............ 18769

[51] Int. Cl.⁴ .................................. B65G 1/02
[52] U.S. Cl. ........................... 198/463.6; 198/464.2; 198/465.1
[58] Field of Search ............ 198/347, 457, 463.3, 198/463.4, 463.6, 464.1, 464.2, 464.4, 465.1, 465.3, 817, 580, 359, 360, 389, 416, 431–433, 424–426, 437, 442, 346.1, 346.2, 356, 600, 681, 803.2; 414/101, 110; 193/35 R, 35 G

[56] References Cited

U.S. PATENT DOCUMENTS

| | | | |
|---|---|---|---|
| 2,937,788 | 5/1960 | Darsie | 198/463.6 X |
| 3,384,097 | 5/1968 | Meeker et al. | 198/730 X |
| 3,650,373 | 3/1972 | Kern et al. | 198/465.1 X |
| 3,706,369 | 12/1972 | Ishida et al. | 198/389 |
| 3,918,367 | 11/1975 | Alimanestianu | 198/347 |
| 4,221,519 | 9/1980 | Nord et al. | 414/110 X |
| 4,300,366 | 11/1981 | Barrett | 198/580 X |
| 4,371,075 | 2/1983 | Erlichman | 198/465.2 X |
| 4,373,437 | 2/1983 | Rodenbaugh et al. | 198/463.4 X |
| 4,448,300 | 5/1984 | Reich et al. | 198/633 X |
| 4,494,644 | 1/1985 | Rizzo, Sr. | 198/463.6 X |
| 4,560,057 | 12/1985 | Applegate et al. | 198/347 |
| 4,564,100 | 1/1986 | Moon | 198/465.1 X |
| 4,570,783 | 2/1986 | Newcom et al. | 198/347 |
| 4,585,113 | 4/1986 | Greenwell | 198/347 |
| 4,667,804 | 5/1987 | Dubuit et al. | 198/465.1 X |

FOREIGN PATENT DOCUMENTS 3544560 7/1986 Fed. Rep. of Germany ...... 198/580

*Primary Examiner*—Robert J. Spar
*Assistant Examiner*—Lyle K. Kimms
*Attorney, Agent, or Firm*—Harold H. Sweeney, Jr.

[57] ABSTRACT

A conveyor system including a buffer store for the temporary retention of articles delivered by the conveyor to the store. Articles are raised out of contact with the conveyor by two ramps one passing under a flange on each side of the article. The conveyor and ramps are downwardly inclined in this area so the article travels along the ramps under gravity until hitting a stop. The articles are in two parts, each upper part being removed from the store by a robot and normally only the lower, reusable part being returned to the conveyor. A second stop is also provided adjacent the first to permit the return of only one article base to the conveyor. Sensors are provided to detect the present of articles in the store.

7 Claims, 2 Drawing Sheets

CONVEYOR SYSTEM INCLUDING A BUFFER STORE

DESCRIPTION

1. Technical Field of the Invention

The present invention relates to a buffer store for temporarily retaining articles from a conveyor.

2. Background Art

In order for a robot or other tool to carry out an operation on articles being transported by conveyor, it is usually necessary to stop and precisely locate each article in a buffer store associated with the conveyor.

U.S. Pat. No. 3,913,902 (Dornier System G.m.b.H), entitled "Workpiece Locating Apparatus", discloses such a buffer store for use with a conveyor whereby articles on the conveyor are delivered to a fixed point where they are accurately located. The workpieces are each of the form of a vertically mounted shaft with an enlarged, bulbous upper end. The conveyor is a band conveyor with vertically-mounted tubes inset into the band at regular intervals. Each tube supports and retains a workpiece.

The buffer store consists of two parallel supports, each in three sections: an upwardly inclined section, a horizontal section with a small central depression, and a downwardly inclined section. The supports are mounted above and parallel to the conveyor and are separated by a distance slightly greater than the thickness of the main shafts of the workpieces. In operation, the underside of the bulbous end of the workpiece contacts and slides up the upwardly inclined sections and the workpiece is lifted up onto the horizontal sections and dropped slightly into the depressions. At this point the conveyor is stopped and an operation is performed on the upper face of the bulbous end of the workpiece. Once this is successfully completed, the conveyor is restarted, the workpiece is pulled out of the depression and slides down the downwardly inclined sections. This sequence is then repeated on the next workpiece.

It will be apparent from this that the conveyor must be stopped each time a workpiece reaches the point at which an operation is to be performed on it and that its accurate location at this point depends to some extent on the accuracy with which the conveyor can be stopped. Additionally, this apparatus does not provide the facility of storing more than one article at a time, so that no variation in the production rates of this workstation or other workstations on this conveyor can be accommodated.

U.S. Pat. No. 4,149,626 (Shell Internationale Research), entitled "Improvements to Handling Systems for Industrial Products", discloses a conveying system with a band used to both support and propel articles (primarily industrial gas bottles) with, on either side, a row of inverted U-shaped members which may be raised by inflating air bags, thus removing the articles from contact with the band and stopping them, without necessitating stopping the conveyor.

UK Pat. No. 1,525,975 (Simon Container Machinery Ltd), entitled "Improvements in or relating to Accumulating Conveyor Systems", discloses a conveying system again with a central band used to propel articles but with, on either side, a row of parallel rollers. The rollers carry the main weight of the articles at all times and the band may be raised into contact with an article by inflating air bags thus providing a motive force to it or the band may be lowered so that an article may be free to continue moving or to stop, due either to frictional retarding forces, coming into contact with a slower-moving article in front or hitting an end-stop. With this system, as with that of UK Pat. No. 1,473,679 a separately controlled and powered mechanism for inflating and deflating the air bags is required.

UK Pat. No. 744,297 (De Burgh), entitled "Conveyor Systems", discloses a conveying system including 2 parallel spaced-apart rows of rollers. These are used to support a plurality of individual pallets, each pallet having a stout peg attached centrally to its underside such that it may be pushed along by a U-shaped clip which engages with this peg, the U-shaped clip being one of many which form a continuous train of clips along the centre of the conveyor. This train of clips is continuously driven.

It is necessary at one stage along the conveyor to close-pack the pallets. This is achieved by lowering the train of clips in the relevant area, out of contact with the pegs on the pallets. A pallet entering this area therefore slows down and eventually stops, until another pallet comes along behind and pushes it along by one pallet's length. The length of this area is such that 6 pallets are held at any one time; when a seventh enters the area, the first pallet is pushed out, its peg is engaged by a pushing clip and it is carried away. In order to reduce the load on the clip and peg pushing the arriving pallet (which is required to move a total of 7 pallets) the conveyor is angled downwards in this area so that gravity assists in overcoming the friction of the rollers. Once the conveyor is operational, this area always contains 6 pallets; they are not accurately located, since the positions they take up depend on the friction in the rollers, their individual masses, physical tolerances in the pegs and pushing clips and any additional friction devices which may be added to retard their motion.

SUMMARY OF THE INVENTION

The prior art has therefore failed to provide a buffer store, for use with a conveyor, which is capable of temporarily removing articles from the conveyor, stopping them at an accurately-located operating position and returning them to the conveyor without requiring additional drive sources and without stopping the conveyor.

Accordingly, the present invention provides a conveyor system including a buffer store positioned above a conveyor for temporarily retaining articles from said conveyor, said conveyor including a downwardly inclined section in the region of the buffer store and said buffer store including a leading portion positioned to engage an article on the conveyor such that the article is lifted from the conveyor by virtue of their motion, a downwardly inclined chute portion downstream of the leading portion along which the article tends to move under the action of gravity, at least one gating means which is operable to temporarily stop said article in said buffer store and subsequently to release said article, and a trailing portion downstream of said gating means arranged to guide the article back on to the conveyor.

Thus, by appropriate positioning and inclination of the buffer means and the conveyor itself, articles are removed, temporarily arrested and returned to the conveyor without the need for any other powered drive than that of the conveyor itself and the assistance of gravity.

Preferably the conveyor system includes a second gating means operable in combination with said one gating means to permit the exit from the buffer store of one of a plurality of articles at a time. This provides better control of the flow of articles through the buffer store and can ensure that each article receives attention before being returned to the conveyor.

Also preferably, the buffer store leading, chute and trailing portions comprise two spaced apart rows of rollers 27, providing low frictional resistance to the movement of an article through the store, thereby reducing the risk of an article jamming in the store and reducing the amount of material shed by frictional movement between the article and the store.

Additionally, the upper surface of the conveyor may include projections separated along the conveyor by a distance equal to or greater than the length of the articles, thereby ensuring that the articles will be carried along by the conveyor when it is upwardly inclined, without the articles sliding backwards to any significant degree. This approach is preferable to providing the conveyor with a roughened upper surface since this latter approach could permit an article to slide backwards down the conveyor to an unknown extent. This would significantly complicate the design of the attendant control system.

Preferably the conveyor system includes at least one sensing means for sensing the presence of an article in the buffer store. In the case where the conveyor system is for use with articles each composed of an upper section and a lower section, a sensing means sensitive to the presence of the lower section of an article and a second sensing means sensitive to the presence of the upper section of an article are preferably provided. The addition of both these sensing means permits either the entire article or just the lower section, which may be a pallet, to be selectively released back to the conveyor as desired.

BRIEF DESCRIPTION OF THE DRAWINGS

The invention will now be described, by way of example only, with reference to the following drawings, in which.

DESCRIPTION OF THE PREFERRED EMBODIMENT

Figure 1:
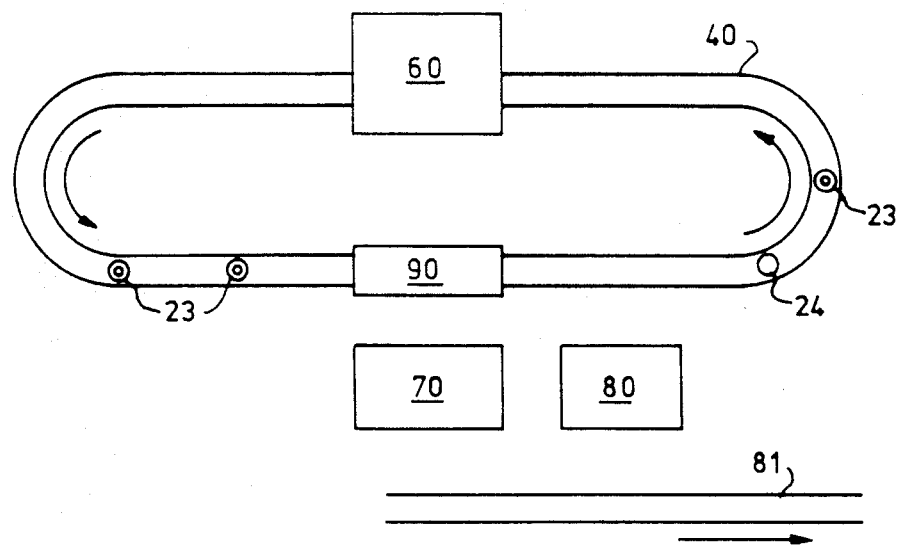
FIG. 1 shows an overall schematic view of a manufacturing line including a conveyor system according to the present invention.

Referring to FIG. 1, a buffer store 90 and robot 70 are arranged to receive and deliver articles from and to conveyor 40 and to conveyor 81. Disk stacks 25 (FIG. 4) are assembled and placed on pallets 24 to form articles 23 at build station 60. These are delivered to robot 70 by conveyor 40 and buffer store 90. The disk stack 25 is tested at test apparatus 80 and delivered to conveyor 81, if the test is passed, or returned to pallet 24, if the test fails, to be returned to build station 60 for rectification.

Figure 2:
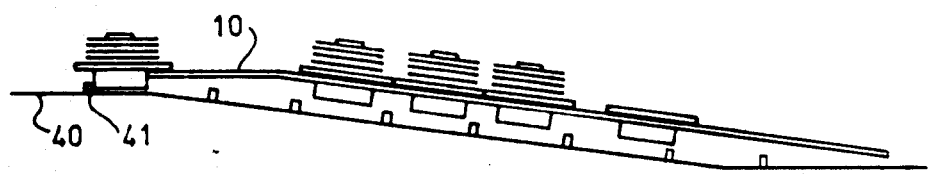
FIG. 2 shows a simplified side elevation of a portion of the conveyor system of FIG. 1 including a buffer store containing a number of disk stacks on pallets.
Figure 3:
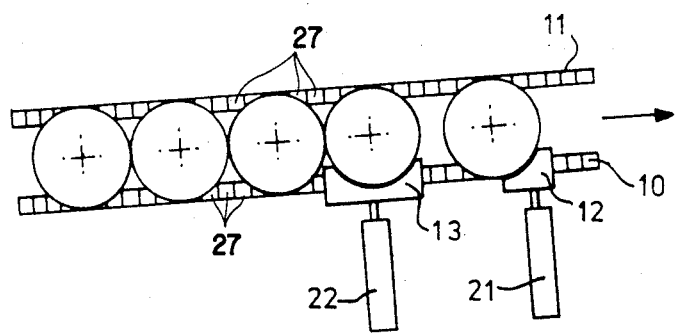
FIG. 3 is a plan view of the conveyor system of FIG. 2 showing gating means forming part of the buffer store.
Figure 4:
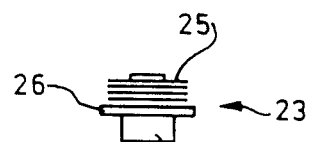
FIG. 4 is a side view of a disk stack and pallet as included in FIG. 2.

Referring to FIGS. 2, 3 and 4 the buffer store includes two parallel supports 10, 11, two pneumatically-operated stops 12, 13 and a total of seven sensors 14 to 20 arranged to detect articles in the store. The supports 10, 11 are each composed of a row of rollers with axes arranged horizontally and perpendicular to the length of the store. The stops 12, 13 are operated independently by pneumatic cylinders 21, 22 in order to permit or inhibit the passage of articles 23 along the store.

Figure 5:
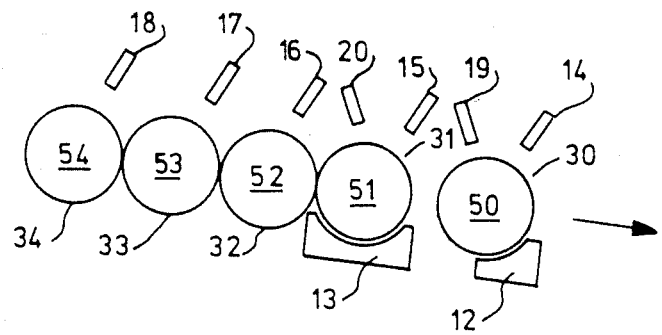
FIG. 5 is a plan view showing the arrangement of a number of sensors and of the gates relative to articles in the buffer store illustrated in FIGS. 2 and 3.

Each article 23 is in two separable parts, a pallet 24 including a spigot and a disk stack 25 with a central cylindrical hole which locates on the spigot of pallet 24. The sensors 14 to 18 are arranged as shown in FIG. 5 to detect the presence of a pallet 24 in each of the five positions 30 to 34 available in the store and sensors 19, 20 are arranged to detect the presence of a disk stack 25 on a pallet 24 at locations 30, 31 respectively.

Each sensor includes a source for transmitting light and a detector for receiving light. If an article is present at the appropriate location adjacent the sensor, a significant proportion of the light transmitted will be received by the detector; otherwise, a very small amount of light will be received. Thus each sensor can detect the presence or absence of an article.

The conveyor 40 is downwardly inclined in the region of the store and includes projections 41 across its surface. The conveyor is of the type known as a "chain" conveyor, i.e. it is composed of many discrete sections interlocked to provide a continuous conveying surface, all running within guides. This design permits the conveyor to change direction in both vertical and horizontal directions. This can be compared with a band conveyor which only permits a change of direction in one direction, e.g. vertically.

In operation, an article 23 is delivered to the store by the conveyor; the article is picked off the conveyor by the leading edges of the parallel supports 10, 11 which engage the underside of a flange 26 on pallet 24. As the conveyor progresses, the article is pushed by projection 41 until the trailing edge of the article has separated from the conveyor surface by a distance equal to the height of the projection, when motive contact between the conveyor and the article is lost. The conveyor continues running with no interruption while the article slides along a chute portion, formed by the intermediate sections of the supports 10 and 11, under the action of gravity until it hits another article or a stop and comes to temporary rest in one of positions 30 to 34 (see FIG. 5).

Taking the example where the particular article 52, including pallet 24 and disk stack 25, comes to rest at position 32, its further progress through the buffer store is as follows: gate 12 is retracted, allowing article 50 to travel over the final trailing portion of the parallel supports 10 and 11 and return to the conveyor travelling beneath. The trailing portion is the portion of the downwardly inclined chute portion that is downstream of the gating means and which extends to the conveyor below. It is not important to synchronise this release operation with the passing projections on the conveyor since it is quite acceptable for the returned article 50 to sit astride a projection on the conveyor and subsequently slip back into a slot between projections when it reaches an upwardly inclined section of conveyor. Once the sensor 14 has detected the escape of article 50 and a subsequent small delay has occurred, gate 12 is extended into position. Gate 13 is then retracted and article 51 slides to position 30, article 52 sliding to position 31. Gate 13 is then extended to locate article 52 accurately. Sensors 15 and 20 confirm the presence of both the pallet 24 and disk stack 25 of article 52 and the robot 70 then removes disk stack 25 of article 52 and the robot 70 then removes disk stack 25 to the separate testing station 80 (FIG. 1). Sensor 20 confirms that the removal operation was successful. Gates 12 and 13 are then operated as before, passing the empty pallet 24 to position 30.

The subsequent release of the pallet 24 back to the conveyor is dependent on the result of the disk stack testing operation in test apparatus 80. If the test was successful, the disk stack 25 is placed on a different conveyor 81 to continue its progress through production. If, however, the disk stack is rejected by the testing apparatus 80, then it must be returned by conveyor 40 to build station 60. Either movement is effected by robot 70 which, after test of the disk stack 25, picks it up from test apparatus 80 and either delivers it to conveyor 81 or returns it to its original position on pallet 24 at position 30. Therefore once either disk stack 25 has passed the test or it has failed and sensor 19 detects that it has been returned to position 30, stop 12 is retracted and pallet 24, with or without disk stack 25 on top, is returned to the conveyor.

Since in practice the test operation at apparatus 80 is slow compared to the disk stack assembly operations at build station 60, there are actually six test apparatuses and two robots delivering disk stacks to and from them. The only impact this has on the buffer store operation described above is that any reject disk stack to be returned to the build station via a pallet 24 at position 30 will probably not be the same disk stack as the disk stack removed from that pallet at position 31.

Various protection features are provided by the array of sensors 14 to 20. These include:

(a) sensor 14 is used to verify that a pallet is waiting at position 30 when it is desired to place a reject disk stack on top for return to build station 60

(b) sensor 19 is used to verify that the disk stack has been successfully delivered in the above case (c) sensor 15 is used to verify that a pallet has arrived at position 31 - this may not be the case, for example, if the production rate at build station 60 is insufficient (d) sensor 20 is used to verify both that a disk stack has been delivered by the pallet at position 31 and that it subsequently has been removed successfully by robot 70.

(e) sensors 16, 17 and 18 could be used to produce a remote indication of the number of pallets in the store but this has not been found to be necessary. However, the combination of an active signal from all three of these sensors is used as a buffer full indication which is used to stop the conveyor since the store in this state could not accept another pallet.

What we claim is:

1. A conveyor system including a buffer store positioned above a conveyor for temporarily retaining articles from said conveyor, said conveyor including a downwardly inclined section in the region of the buffer store and said buffer store including a leading portion positioned to engage an article as it moves along the conveyor and to lift the article from the conveyor;
    said conveyor having a downward slope greater than the downward slope of said leading portion such that the leading portion maintains engagement with the article through the action of gravity when said article is lifted from said conveyor;
    a downwardly inclined chute portion forming part of said buffer store downstream of the leading portion along which the article tends to move under the action of gravity;
    at least one gating means along said downwardly inclined chute portion which is operable to temporarily stop said article in said buffer store and subsequently to release said article; and
    a trailing portion of said downwardly inclined chute portion downstream of said gating means positioned to guide the article back on to the conveyor.

2. A conveyor system as claimed in claim 1, including a second gating means operable in combination with said one gating means to permit the exit from the buffer store of one of a plurality of articles at a time.

3. A conveyor system including a buffer store positioned above a conveyor for temporarily retaining articles from said conveyor, said conveyor including a downwardly inclined section in the region of the buffer store and said buffer store including a leading portion positioned to engage an article as it moved along the conveyor and to lift the article from the conveyor;
    a downwardly inclined chute portion forming part of said buffer store downstream of the leading portion along which the article tends to move under the action of gravity;
    at least one gating means along said downwardly inclined chute portion which is operable to temporarily stop said article in said buffer store and subsequently to release said article; and
    a trailing portion of said downwardly inclined chute portion downstream of said gating means positioned to guide the article back on to the conveyor;
    wherein said buffer store leading, chute and trailing portions comprise two spaced apart rows of rollers.

4. A conveyor system as claimed in claim 1, in which the upper surface of said conveyor includes projections separated along the conveyor by a distance equal to or greater than the length of said articles.

5. A conveyor system as claimed in claim 1, including at least one sensing means for sensing the presence of an article in the buffer store.

6. A conveyor system for use with articles composed of an upper section and a lower section including a buffer store positioned above a conveyor for temporarily retaining articles from said conveyor, and at least a first and second sensing means for sensing the presence of an article in the buffer store, said conveyor including a downwardly inclined section in the region of the buffer store and said buffer store including a leading portion positioned to engage an article as it moves along the conveyor and to lift the article from the conveyor;
    a downwardly inclined chute portion forming part of said buffer store downstream of the leading portion along which the article tends to move under the action of gravity;
    at least one gating means along said downwardly inclined chute portion which is operable to temporarily stop said article in said buffer store and subsequently to release said article; and
    a trailing portion of said downwardly inclined chute portion downstream of said gating means positioned to guide the article back on to the conveyor;
    wherein said first sensing means is sensitive to the presence of the lower section of an article and said second sensing means is sensitive to the presence of the upper section of an article.

7. A conveyor system as claimed in claim 1, including a plurality of sensing means sensitive to the presence of articles in the buffer store.

* * * * *